United States Patent Office

Re. 25,586
Reissued June 2, 1964

25,586
COLOR PHOTOGRAPHIC MATERIAL AND PROCESS

Bela Gaspar, Beverly Hills, Calif., and Gustave B. Linden, Short Hills, N.J., assignors, by mesne assiguments, to Minnnesota Mining and Manufacturing Company, St. Paul, Minn., a corporation of Delaware

No Drawing. Original No. 2,943,934, dated July 5, 1960, Ser. No. 381,473, Sept. 18, 1953, which is a division of Ser. No. 225,267, May 8, 1951. Application for reissue June 27, 1962, Ser. No. 207,849
14 Claims. (Cl. 96—53)

Matter enclosed in heavy brackets [ ] appears in the original patent but forms no part of this reissue specification; matter printed in italics indicates the additions made by reissue.

This invention relates to color photography. More particularly, it relates to dye forming compounds, to photographic colloids comprising these compounds and to intermediates from which these compounds can be made.

This application is a division of application Serial No. 225,267, filed May 8, 1951.

In those photographic processes in which dye forming compounds are incorporated in light sensitive materials, these compounds should be soluble and fast to diffusion. Their solubility facilitates their even distribution while the material is manufactured and their reactivity in later processing steps such as in the azo dye bleach-out process or in the color development process. On the other hand, their resistance to diffusion keeps them from being washed out or from wandering from those discrete portions of the colloid into which they were incorporated.

Many methods are proposed by which soluble non-diffusing dye forming compounds may be obtained. However, most of these methods lead to compounds which are insufficiently soluble or which diffuse too much; the introduction of "non-diffusing radicals" into their molecule diminishes their solubility, or the introduction of "solubilizing radicals" into their molecule increases their tendency to diffuse. Furthermore, most of the known "non-diffusing radicals" ballast the molecule of the dye forming compound to a very high degree whereby, during the processing of the photographic material, dyes of low tinctorial strength are produced.

Many of the soluble, non-diffusing dye forming compounds hitherto known have still other disadvantages: e.g., they desensitize the light sensitive emulsion, they crystallize, or they thicken the colloid. Some of them are made by complex and expensive synthesis or by methods of limited scope.

It is therefore an object of the present invention to produce photographic dye images in light sensitive emulsions by means of soluble, non-diffusing dye-forming compounds which do not have the above mentioned disadvantages. A further object of the present invention is an improved preparation, isolation and purification method for resin sulfochlorides and the reaction products thereof. Further objects and advantages will be seen from the detailed specification following hereafter.

It has been found that dye-forming compounds

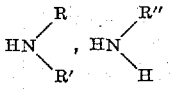

and HOR (of which the first ones are preferred) where R stands for a radical comprising a functional group whereby the compound acts as a dye forming compound, where R′ stands for hydrogen, alkyl or aryl, and where R″ stands for an aromatic radical having an available coupling position, are rendered non-diffusing by reacting with compounds

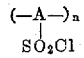

where A stands for an organic radical, and where $n$ stands for an integer greater than 2. In this reaction, compounds are formed which adhere to the general formula

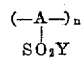

where at least some of the Y's stand for the group

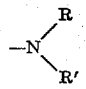

or —OR or —NHR″ and where some of the Y's may stand for chlorine and after hydrolysis for an —O— cation group.

The functional group in the radical R can be a phenolic, enolic, aromatic amino or any other group whereby the compound becomes reactive with the oxydation products of developing compounds, with diazo compounds, with azo coupling compounds or with other dye forming reagents. Suitable radicals R are, e.g., those derived from acetoacetic acid, pyrazolone, naphtholsulfonic acid, naphthylamine, diazoaminobenzene, phenylhydrazine, etc. However, we prefer those compounds which function as azo coupling components, and in second line, those which function as color development components. The preferred components

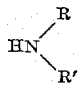

therefore, can be exemplified by:
Benzoylacet-(p-amino)anilide;
1-(p-aminophenyl)-3-methylpyrazolone;
1,2,3,4-tetrahydro-2,4-dioxo-6-aminoquinoline;
m-Aminophenol;
m-Diethylaminophenyl β-(p-aminophenoxy)-ethyl ether;
m-Diethylaminophenyl β-(methylamino)-ethyl ether;
1,5-aminonaphthol;
1-p-aminobenzoylamino-5-naphthol;
1-methylamino-5-naphthol;
1-phenylamino-5-naphthol;
3-diethylaminoaniline;
N-(aminobenzoyl)-H-acid;
m-Aminophenylcyanoacetyl urea;
6-aminocoumaranone;
(1-hydroxy-2-naphthoyl)-ethylenediamine.

The compounds ROH can be exemplified by 1,5-dihydroxynaphthalene and p-acetoacetamido phenol. Aromatic amines $NH_2R''$ such as 1-naphthylamine reacting with a polymeric sulfochloride form compounds having the formula

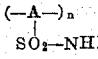

These compounds where the residue R'' has an available coupling position can couple in alkaline medium with diazo compounds or with the oxydation products of color developers to form dyes.

The compound $$(-\underset{\underset{SO_2Cl}{|}}{A}-)_n$$

can be obtained by chlorosulfonation of compounds $(-A'-)_{n'}$ or by sulfonation of these compounds, followed by conversion of the sulfonic acid into a sulfochloride group. In these formulas A' stands for an organic radical and n' stands for an integer greater than 2. A will equal A' and n will equal n' in those cases where one sulfochloride group is attached to each of the A' units. Another way consists in the polymerization of sulfonated monomeric compounds.

The preferred way of obtaining the compound $$(-\underset{\underset{SO_2Cl}{|}}{A}-)_n$$

in treating a compound $(-A'-)_{n'}$ where A comprises an aromatic nucleus with chlorosulfonic acid. Compounds of the type $(-A'-)_{n'}$ are known to be converted into sulfonic acids by treatment with chlorosulfonic acid; but we prefer to use more chlorosulfonic acid than previous workers did, in order to obtain sulfochloride groups. The reaction is carried out in one operation in the presence of a suitable solvent such as halogenated or unhalogenated saturated aliphatic hydrocarbons, i.e., carbontetrachloride, trichloroethane, ethylene chloride, heptane. We found that in performing this operation the proportion of organic solvent to chlorosulfonating agent is of considerable importance and should be chosen in such a manner that the reaction mixture remains essentially homogeneous. We have found that the above mentioned organic solvents dissolve most of the unsulfonated starting materials but tend to precipitate the sulfonation products before the desired number of sulfochloride groups have entered the molecule. We, therefore, use a sufficient excess of chlorosulfonic acid to keep the sulfonation product in solution at least in the early stages of the reaction. After having obtained the desired sulfochloride, the quantity of organic solvent is increased, whereby the sulfochloride is precipitated. In other words: A compound $(-A'-)_{n'}$, dissolved in a small amount of organic solvent, is chlorosulfonated with an excess of chlorosulfonic acid, and the sulfochloride formed is precipitated with a large amount of organic solvent. While it was already known to react polystyrene with chlorosulfonic acid, no process for the preparation and isolation of the sulfochloride per se was described. According to the German Patent No. 580,366, polystyrene was reacted with less than the equivalent amount of chlorosulfonic acid, which procedure results in polystyrene sulfonic acid.

The compound $(-A'-)_{n'}$ can be any organic compound containing recurring units —A'— which are capable of carrying sulfohalide groups. $(-A'-)_{n'}$ may be a compound obtained by polymerization or mixed polymerization of unsaturated compounds or by polycondensation of polyfunctional monomeric compounds or it may be a natural polymeric compound. E.g., $(-A'-)_{n'}$ may be polystyrene, natural rubber, an interpolymer of styrene and maleic anhydride, polyvinylnaphthalene, polyvinylcarbazole or the condensate of a dicarboxylic acid with a diamine.

Among suitable compounds $$(-\underset{\underset{SO_2Cl}{|}}{A}-)_n$$

we mention the following:

A compound obtained by chlorosulfonation of polystyrene; a compound obtained by sulfonation of styrene-polysulfone (Journ. Am. Chem. Sec., 59, 709 (1937)), followed by treatment with $PCl_5$; a compound obtained by $PCl_5$ treatment of a rubber sulfonic acid (German Patent 582,565); a compound obtained by $PCl_5$ treatment of an interpolymer of ethylenesulfonic acid with methyl methacrylate (U.S. Patent 2,348,705); the chloride of a sulfonic acid described in German Patent 503,923 which was obtained by sulfonation of an anisol formaldehyde condensation product; the compound obtained by simultaneous polymerization and chlorosulfonation of benzylchloride essentially as in Example 8 of U.S. Patent 2,445,569, but replacing the sulfuric with chlorosulfonic acid; the chloride of a sulfonic acid obtained by condensation of sulfosuccinic acid with ethylenediamine, and having the formula $$\left(-NH-CH_2-CH_2-NH-OC-\underset{\underset{SO_2Cl}{|}}{CH}-CH_2-CO-NH-CH_2-CH_2-NH-\right)_n$$

(U.S. Patent 2,252,401); a compound obtained by chlorosulfonation of dimethoxydinaphthylhydro-rubber (Helv. Chem. Acta, 10, 536 (1927)); a compound obtained by chlorosulfonation of the condensation product formed from adipic acid and m-phenylenediamine, and having the formula

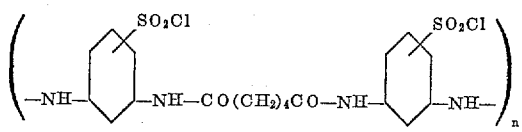

a compound obtained by condensing 1:1 hydroquinone with trimethylenebromide, by sulfonating the condensation product and by treating the sodium salt of this sulfonic acid with phosphorous pentachloride, said compound having the formula

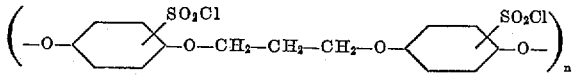

In some of these compounds the $-SO_2Cl$ groups are attached to aliphatic carbon atoms; in other compounds they are attached to aromatic carbon atoms.

From a compound, obtained by interpolymerization of ethyl vinylsulfonate with styrene, a variety of derivatives can be obtained: The compound can be saponified and treated with $PCl_5$ whereby an aliphatic sulfochloride is obtained; or the saponified product is treated with excess of chlorosulfonic acid whereby a mixed aliphatic aromatic sulfochloride is obtained; or the compound is treated with chlorosulfonic acid and, after reaction with an amine, saponified whereby an aliphatic sulfonic acid of an aromatic sulfonamide is obtained.

The molecular weight of the above mentioned sulfochlorides may vary within wide limits; however we prefer the use of sulfochlorides derived from polymeric hydrocarbons which hydrocarbons have molecular weights of between 1000 and 10,000. If the degree of polymerization is too high, a sulfochloride is obtained which, upon saponification, swells in aqueous sodium hydroxide without dissolving; the dye forming compound formed from such sulfochloride will be insufficiently soluble or thicken the emulsion. On the other hand, if the degree of polymerization is too low (e.g., in the sulfochlorides of dimerized olefines), the dye forming compound will diffuse appreciably. In indicating the preferred degree of polymerization, however, we want it to be understood that still other factors influence the properties of the compound. E.g., a color coupler derived from polystyrene 15,000 and comprising 90 $-SO_3Na$ groups (=62%) in the molecule is more soluble than a similar product derived from polystyrene 2000 and comprising only 4 $-SO_3Na$ groups (=21%) in the molecule. Those compounds

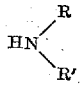

$NH_2R''$ and HOR which combine solubilizing salt-forming groups [such as the above mentioned N-(aminobenzoyl)-H-acid] can be reacted with the sulfochlorides in equivalent proportion. The compounds, thereby obtained, adhere to the formula

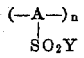

where all the Y's stand for the group

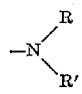

OR— or —NHR''. However, those compounds

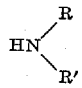

$NH_2R''$ and HOR which are void of solubilizing salt-forming groups, are reacted with an excess of sulfochloride, and the sulfochloride groups in excess are saponified whereby compounds are obtained where some of the Y's stand for —O— cation groups. The cation is preferably hydrogen or an alkali metal depending on which product can be isolated conveniently.

The number of free —O— cation groups necessary for complete solubilization depends on the character of the radical A, on the degree of polymerization (n) and on the nature of the functional residue. It must be determined empirically in each case which degree of polymerization and which number of free sulfonic acid groups is necessary to produce compounds having desirable qualities. However, we found in most cases that non-diffusing and well soluble dye-forming compounds of good tinctorial strength are obtained by reacting one molecular part of a compound

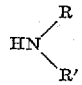

HOR or $NH_2R''$ (void of solubilizing groups) with from 1.5 to 5 equivalents of a compound

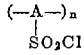

The dye-forming compounds of this invention do not diffuse on account of the highly polymeric sulfonyl radical attached to the molecule. The fastness to diffusion therefore is independent from the functional radical attached to said sulfonyl radical. For example, all the derivatives of polystyrenesulfonic acid are non-diffusing, and it does not matter whether these derivatives were obtained by reacting polystyrenesulfochloride with diffusing low molecular weight aminophenol or with a substantive amino-aryl-urea.

The fastness to diffusion, found in the dye-forming compounds of this invention, therefore is conserved in the derivatives obtained from the dye-forming compounds. For example, if a non-diffusing azo coupling component of this invention is coupled with a diazo compound, an azo dye is formed which still contains the polymeric sulfo residue and therefore does not diffuse.

Whereas, in the prior art, each soluble non-diffusing dye forming compound must be individually tailored, the synthesis of these compounds is greatly simplified by the present invention. All that is needed is one polymeric sulfochloride which may be used universally for all dye forming compounds containing amino or hydroxyl groups by which they can be attached to the sulfochloride. The fact that sulfochloride groups are used for introducing the solubilizing groups ($—SO_3H$) into the molecule, and that sulfochloride groups are used for rendering the dye forming monomeric component fast to diffusion, allows this simple procedure which does away with introducing "non-diffusing radicals" and "solubilizing radicals" into a dye forming molecule.

It shall be clearly understood that the general formula is not meant to represent a chemical individual. Polymers $(—A'—)_{n'}$ from which the compounds of our invention are obtained, might contain terminal groups which are different from groups in the middle of the chain. Irregularities such as branchings might occur within the otherwise linear molecule. The symbol "$n'$" might stand for a statistical value instead of one integer. Similarly, the number of sulfonic acid or sulfonamide groups within the molecule might vary within certain limits; e.g., the sulfonation of a compound $(—A'—)_{n'}$ with chlorosulfonic acid may lead to a product in which only 50% of the aromatic nuclei carry sulfochloride groups or in which some of the aromatic nuclei carry more than one sulfochloride group. The formulae disclosed herein therefore cannot be regarded as complete structural representations, but merely serve to illustrate those features of the molecules which are considered essential for understanding their behavior.

The dye-forming compounds, obtained according to our novel method, are dissolved in water and added to a photographic colloid such as gelatin, vinyl alcohol, cellulose glycolic acid, polyacrylamide. Those dye-forming compounds which were isolated as difficultly soluble free acids are dissolved in aqueous alkali to form the easily soluble salts, and these salt solutions are then stirred into the photographic colloid. The colloid, comprising the compounds, may be coated as a layer on a support or as a discrete particle within a layer. The light-sensitive agent such as silver halide, might be within that portion of the colloid which comprises the dye-forming compounds of our invention or it might be in an adjacent portion. The photographic material may comprise only one dye-forming compound, or may comprise a plurality of discrete portions and a plurality of dye-forming compounds.

The dye-forming compounds of this invention are colored or colorless. Among the colored ones we mention those azo dyes which are capable of coupling with diazo compounds or of reacting with the oxidation products of color developing agents. However, we prefer those dye-forming compounds which are colorless. These colorless dye-forming compounds are incorporated in colorless photographic materials or in materials comprising light screening elements such as yellow filter layers. The dye-forming molecule might also be a part of the carrier or binding agent for the silver halide or other light sensitive materials.

The light sensitive photographic material comprising a dye-forming compound of this invention is subjected to the usual photographic processes including those whereby the dye-forming compound is converted into a dye and those whereby the latent silver image is converted into a proportional or reversed dye image. Among these processes we mention the color development and the dye-bleach process. Other processes are well within the scope of the present inventions. However, the preferred process consists in producing an azo dye by coupling the dye-forming compound with a diazo compound at a point after the exposure to light and by destroying the diazo compound or the azo dye at those points where metallic silver has been developed.

The following examples will serve to illustrate the manner of obtaining our new compounds and of using them in photographic materials.

EXAMPLE 1

Twenty-five parts by weight of Dow Resin PS–1 (which is a polystyrene of molecular weight 6000, manufactured and sold by the Dow Chemical Company) were dissolved in 80 parts by volume of ethylene chloride. This solution was added to chlorosulfonic acid (120 parts by volume) over a period of 2 hours while the temperature was kept below 0° C., and the mixture, forming a nearly homogeneous solution, was stirred for an additional 3 hours at this temperature. The next day a few undissolved particles were removed by filtration and discarded. The chlorosulfonated resin was precipitated by addition of 700 parts by volume ethylenechloride, the liquid was decanted, the residue was washed with three portions of ethylene chloride (each portion amounting to 250 parts by volume) and purified by dissolving in acetone and precipitating from this solution by the addition of benzene. The precipitate was a nearly colorless solid which dissolved in acetone or dimethylformamide or, after heating, in aqueous sodium hydroxide solution.

By determination of the sulfochloride groups it was found that the compound has an equivalent weight of 215, indicating a 95% chlorosulfonation.

A similar compound was obtained by treating Dow Resin PS–2 (polystyrene, molecular weight 9000) in the above manner.

EXAMPLE 2

The sulfochloride of the foregoing example (2,5-equivalent parts) was dissolved in acetone. N-(m-aminobenzenesulfo)-1,5-aminonaphthol (1.0 equvalent part) and pyridine (2.5 equivalent parts) were dissolved in acetone. This solution was slowly added with stirring and cooling to the sulfochloride solution. The reaction was completed by heating to reflux. A resinous mass separated which was dissolved, by heating, in 1 n NaOH, and precipitated from the alkaline solution with 1 n HCl.

The compound is believed to be a linear molecule, having about 22 units:

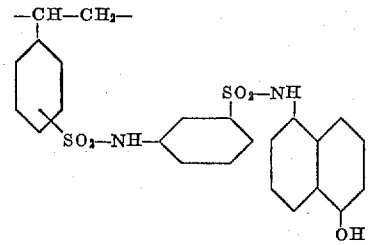

and about 33 units:

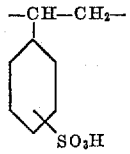

and about 3 units:

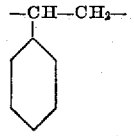

It is soluble in aqueous sodium bicarbonate solution. The neutral solution can be added to a photographic silver halide emulsion. An emulsion, containing 7% gelatin and 0.8% of this dye-forming compound can be coated by normal procedures. The presence of this dye-forming compound does not influence the light sensitivity of silver bromide emulsions sensitized to blue, green or red light. If coated in a multilayer material, no wandering of the compound from layer to layer takes place, as can be shown by development with p-diethylaminoaniline or by coupling with a diazo component.

The compound obtained from the sulfochloride of Example 1 and 1,5-aminonaphthol has similar properties. These compounds, when coupled with diazotized 4-nitro-1-naphthylamine-6-sulfonic acid, yield azo dyes which are cyan above pH 7.

EXAMPLE 3

The sulfochloride of Example 1 (2 equivalent parts) is reacted with N,N-dimethyl-m-phenylenediamine (1 equivalent part) in a similar manner as described in the previous example. The compound thereby obtained is believed to have essentially the following constitution

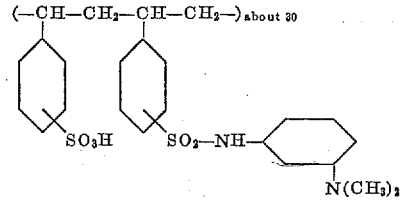

The compound is colorless, easily soluble, does not diffuse within a photographic colloid, does not desensitize a silver halide emulsion and reacts easily with diazo compounds to form dyes of high tinctorial strength.

The compound obtained from the sulfochloride of Example 1 and N,N-dimethyl-N′-p-aminobenzoyl-m-phenylenediamine has similar properties. Diazotized 2-nitraniline-4-sulfonic acid couples with these compounds to produce azo dyes which are magenta at pH 8.

EXAMPLE 4

A compound of the following probable constitution

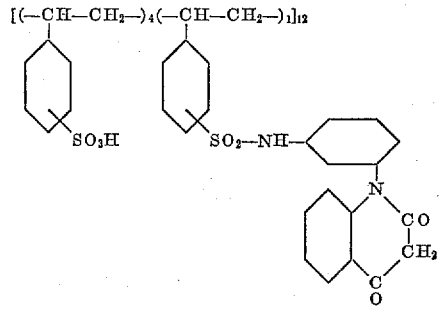

is obtained by condensing 5:1 the sulfochloride of Example 1 with N-(m-aminophenyl)-1,2,3,4-tetrahydro-2,4-dioxoquinoline. The compound has all the qualities mentioned for the compound of the previous example. The azo dye obtained from this compound and diazotized 2-nitraniline-4-sulfonic acid is yellow.

EXAMPLE 5

Four layers are coated on a transparent support in the following order:

(1) A red-sensitized gelatin silver bromide emulsion containing a cyan coupler obtained by condensing 2 equivalents of polystyrenesulfochloride and 1 equivalent of 1,5-aminonaphthol and by hydrolizing the unreacted sulfochloride groups.

(2) A green-sensitized gelatin silver bromide emulsion containing a magenta coupler obtained by condensing 2 equivalents of polystyrenesulfochloride and 1 equivalent of m-diethylaminoaniline and by hydrolizing the unreacted sulfochloride groups.

(3) A filter layer comprising gelatin and colloidal silver.

(4) An only blue sensitive gelatin silver bromide emulsion containing a yellow coupler obtained by condensing 3.4 equivalents of polystyrene-sulfochloride with 1 equivalent of 6-amino-2,4-dihydroxyquinoline and by hydrolizing the unreacted sulfochloride groups.

The material is exposed in a camera, developed in an alkaline metol hydroquinone developer, and fixed in an acid hypo bath. Thereafter it is bathed for 10 minutes in 1% Duponol ME (a wetting agent manufactured and sold by Du Pont Company) and then bathed for 12 minutes at 5° C. in a bath comprising 60 grams glacial acetic acid
2.5 grams sodium acetate anhydrous
4 grams 4-nitro-1-diazobenzene-2-sulfonic acid
Water to made 1 liter.

In this bath, the diazo compound reacts with the three coupler compounds to form azo dyes which, at pH 8, are cyan, magenta and yellow respectively. These dyes then are destroyed, in proportion to the metallic silver which was developed, by bathing in a solution of 10 mg. 2,3-diamino-phenazine and 6 g. thiourea in one liter of 0.5 n hydrochloric acid. The silver is removed by first bathing in an acid copper chloride bath and then by bathing in a hypo bath. Finally the material is bathed in a sodium phosphate bufferbath of pH 8 whereby the absorption maxima of the cyan and magenta azo dyes are shifted to longer wavelengths. An image in natural colors is obtained.

The silver bromide emulsions of the first, second and fourth layers with and without the coupler compounds were compared sensitometrically. The presence of the coupler compounds had no influence on the sensitivity of the emulsions.

EXAMPLE 6

Equimolecular parts of diethylmaleate and styrene were refluxed in the presence of catalytic amounts of benzoylperoxide. After the initial reaction subsided the temperature was kept at 130° C. for 6 hours.

The mass was dissolved in benzene and precipitated with an isopropanol methanol mixture. This operation was repeated several times. A white powder was obtained.

This compound was dissolved in ethylene dichloride and chlorosulfonated by the procedure of Example 1. A tan powder was obtained which was soluble in acetone. After the saponification with aqueous sodium hydroxide, it was soluble in aqueous sodium acetate or bicarbonate solutions.

The compound served in the acylation of dye-forming compounds such as 1-(p-aminobenzoylamino)-5-naphthol; N,N-dimethyl-m-phenylenediamine; N,N-dimethyl-N'-p-aminobenzoyl-m-phenylenediamine; m-diethylaminophenyl β-(p-aminophenoxy)ethyl ether; 1,2,3,4-tetrahydro-2,4-dioxo-6-aminoquinoline. All these compounds were well soluble, did not diffuse and reacted with diazo compounds, to form azo dyes of high tinctorial strength.

We have found that the sulfochloride of this example can be reacted with components void of solubilizing groups in equivalent proportions, and that the dye-forming compounds thereby formed are soluble as carboxylic acid salts in aqueous media, after hydrolizing the carboxylic ester groups of the reaction products; e.g., by digesting with aqueous alkali. However, if reacted with less than the equivalent quantity of a component, some of the sulfochloride groups will be converted to form sulfonic acid groups which increase the solubility of the product.

For example, we prepared a compound from this acid chloride and 1,5-aminonaphthol in a proportion of 2:1 which we believe to have the following constitution

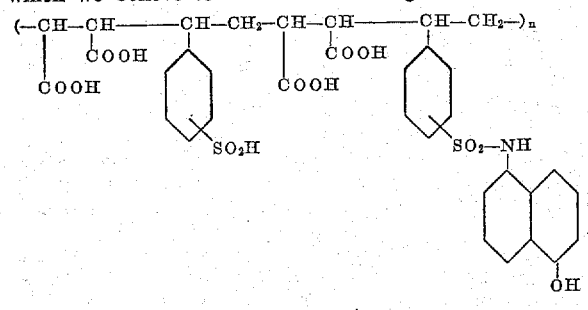

The compound is soluble in aqueous sodium bicarbonate solutions. It can replace the compound of Example 2 in photographic applications such as those of Example 5. The letter "n" in the above formula stands for a whole number greater than 1.

EXAMPLE 7

A material to be used in the color development process can be made by the following procedure: Four layers are coated on one side of a transparent support, viz:

(1) A silverbromide emulsion, sensitized for red light and containing the product obtained by condensing 2 equivalents of polystyrenesulfochloride with 1 equivalent of β-(p-aminophenoxy) ethyl-m-hydroxyphenyl ether and by hydrolizing the unreacted sulfochloride groups.

(2) A silverbromide emulsion, sensitized for green light and containing the product obtained by condensing 2.0 equivalents of polystyrenesulfochloride with 1 equivalent of 1-(p-aminophenyl)-3-methyl-5-pyrazolone, and by hydrolizing the unreacted sulfochloride groups.

(3) A yellow filter layer comprising colloidal silver.

(4) A silverbromide emulsion, void of optical sensitizer and containing the product obtained by condensing 3.0 equivalents of polystyrenesulfochloride with 1 equivalent of m-amino(acetoacetanilide) and by hydrolizing the unreacted sulfochloride groups.

The material is exposed to light in a camera, developed in an amidol developer, exposed to diffuse light and then developed in a developer containing per one liter solution:

| | Grams |
|---|---|
| p-Amino diethylaniline hydrochloride | 2.0 |
| Sodium sulfite anhydrous | 5.0 |
| Sodium carbonate anhydrous | 20.0 |

After the silver is removed in a potassium ferricyanide sodium chloride bath followed by a hypo bath, an image in natural colors is obtained.

EXAMPLE 8

Two equivalents of the sulfochloride of Example 1 are reacted with one equivalent of p-nitrophenol. The unreacted sulfochloride groups are hydrolized, and the reaction product is reduced with iron filings in diluted acetic acid suspension. The compound obtained is believed to adhere essentially to the following formula

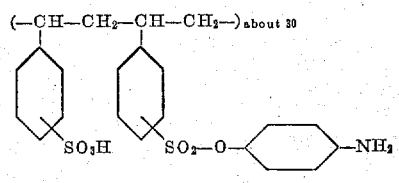

This compound, in form of its sodium salt, can be added to a photographic emulsion and coated onto a support. After exposing, developing and fixing, the material is treated in a bath containing hydrobromic acid and sodium nitrite whereby the polymeric amine is diazotized at the places free of metallic silver. Then the material is bathed in a sodium acetate bath containing N-toluene-sulfo-H-acid whereby the diazo compound is caused to couple with the H-acid derivative. After removal of the silver, a reversed magenta image is obtained.

EXAMPLE 9

The polymeric amine of the foregoing example can serve as a skeleton from which other dye components may be prepared. By reacting the polymeric amine with an excess of salicylchloride in aqueous sodium acetate solution, a soluble non-diffusing product is obtained which forms yellow dyes with most diazo compounds and cyan dyes with color developers containing p-aminodiethylaniline.

EXAMPLE 10

A compound of the following probable structure

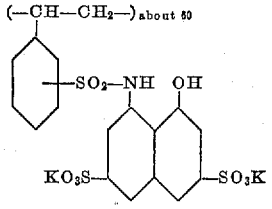

is prepared by dissolving free H-acid (1 equivalent) and cetyldimethylamine (4 equivalents) in methyl-i-butylketone, by distilling off part of the ketone to assure absolute exclusion of humidity, and by adding to the cold solution a solution of polystyrenesulfochloride (1 equivalent) in acetone. The homogeneous solution is refluxed for 15 minutes and cooled. The reaction product is precipitated as potassium salt by addition of a methanolid KOH solution. The solid is washed with acetone and purified by salting out with potassium carbonate from aqueous solution. It is a water soluble tan powder.

A photographic layer, comprising this compound, is exposed to light, developed, fixed, coupled with a diazo compound, treated in a dyebleach bath and freed from silver to produce a dye image which is inversed with respect to the silver image. The addition of the compound to the silver bromide emulsion does not depress the light sensitivity. A gelatin emulsion layer comprising the compound, coated between other gelatin emulsion layers, and processed as above, contains the dye image only in the middle layer; no diffusion is detectable. The color of the dye image depends on the diazo compound used in the process. E.g., by coupling with 4-nitro-2-sulfodiazobenzene, a magenta image is produced, whereas, by coupling with 4-diazo-4'-ethoxydiphenylamine, a blue image is produced.

The free H-acid, used in this example is obtained from the acid barium salt of H-acid and sulfuric acid.

EXAMPLE 11

Two mol equivalents of the sulfochloride of Example 1 are dissolved in acetone and added to an acetone solution containing one mol of salicyl-(m-aminoanilide) and two mols of pyridine. After short heating, the reaction product is precipitated with more pyridine, washed with acetone, dissolved in aqueous sodium hydroxide, precipitated with hydrochloric acid, dissolved again in aqueous sodium hydroxide and precipitated by neutralization with acetic acid. This product is believed to adhere essentially to the following formula:

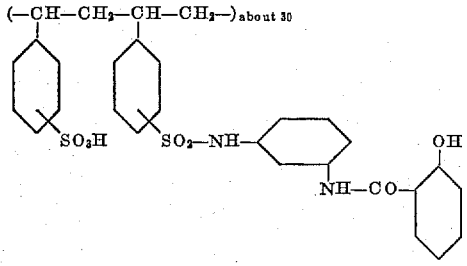

When incorporated into a photographic emulsion, exposed and developed with a developer comprising p-amine-diethylaniline, this product couples to form a cyan dye at those places where metallic silver is developed. A more bluish shade is obtained if the salicyl-(m-aminoanilide) of this example is replaced with 1-(p-aminophenyl)-5-pyrazolone-3-carboxylic acid.

EXAMPLE 12

Two equivalents of the sulfochloride of Example 1 are reacted with one equivalent of 1-naphthylamine in an acetone pyridine mixture and the unreacted sulfochloride groups are hydrolized. The reaction product serves as a component in a photographic layer. When coupled with 4-nitro-2-sulfodiazobenzene it forms a dye which is purple in alkaline medium and weakly yellow in acid medium. When it is coupled with the oxydation product of p-aminodiethylaniline it forms a blue dye.

EXAMPLE 13

The red and green sensitive emulsions of Example 5 are dyed yellow with N-p-tolyl-auramine. These emulsions and the blue sensitive emulsion of Example 5 are hardened, spray-dried, mixed and coated. The material is exposed and processed in the same manner as the material of Example 5. An image in natural colors is obtained.

EXAMPLE 14

A red sensitive gelatin silver chloride emulsion containing the cyan coupler of preceding Example 7, a green sensitive silver chloride emulsion containing the magenta coupler of Example 7 and a blue sensitized silver chloride emulsion containing the yellow coupler of Example 7 are hardened with chrome alum, spray-dried, mixed in a 1% gelatin solution and coated on a support. The material is exposed to light through a #4 Wratten filter and treated in the same way as the material of Example 7.

The silver chloride emulsions of this example can be replaced with silver chlorobromide emulsions containing up to 30% bromide.

We claim:

1. A photographic material comprising an emulsion layer containing a light-sensitive silver halide and a water-soluble non-diffusing dye-forming compound containing —$SO_3$ cation solubilizing groups and said dye-forming compound comprising a high molecular weight polymeric linear chained radical of the group consisting of polymeric hydrocarbon radicals, polymeric oxahydrocarbon radicals; and polymeric carboxylic acid amide radicals having recurring amide groups in the main linear polymeric chain, said polymeric radical carrying a plurality of —$SO_2Y$ groups outside the main linear polymeric chain, wherein Y is a radical selected from the group consisting of azo dye coupling components and a radical capable of coupling with the oxidation products of a primary aromatic amino color developer to form a dye, said radical Y being attached to the $SO_2$ radical by the valence bond of an atom selected from the group consisting of nitrogen and oxygen, and —$SO_2Y$ groups being linked to the main linear chain of said polymeric radical only through carbon atoms selected from the group consisting of carbon atoms of phenyl *nuclei, carbon atoms of naphthyl* nuclei and carbon atoms of the main linear chain.

2. A photographic material comprising an emulsion layer containing a light-sensitive silver halide and a water-soluble non-diffusing dye-forming compound containing —$SO_3$ cation solubilizing groups and said dye-forming compound comprising a high molecular weight polymeric linear chained radical of the group consisting of polymeric hydrocarbon radicals, polymeric oxahydrocarbon radicals, and polymeric carboxylic acid amide radicals having recurring amide groups in the main linear polymeric chain, said polymeric radical carrying a plurality of —$SO_2Y$ groups outside the main linear polymeric chain, wherein Y is a radical selected from the group consisting of azo dye coupling components and a radical capable of coupling with the oxidation products of a primary aromatic amino color developer to form a dye, said radical Y being attached to the $SO_2$ radical by the valence bond of a nitrogen atom, said —$SO_2Y$ groups being linked to the main linear chain of said polymeric radical only through carbon atoms selected from the group consisting of carbon atoms of phenyl *nuclei, carbon atoms of naphthyl* nuclei and carbon atoms of the main linear chain.

3. A photographic material comprising an emulsion layer containing a light-sensitive silver halide and a water-soluble non-diffusing dye-forming compound containing —$SO_3$ cation solubilizing groups and said dye-forming compound comprising a high molecular weight styrene polymer carrying a plurality of —$SO_2Y$ groups in the phenyl nuclei of said styrene polymer, wherein Y is a radical selected from the group consisting of azo dye coupling components and a radical capable of coupling with the oxidation products of a primary aromatic amino color developer to form a dye, said radical Y being attached to the $SO_2$ radical by the valence bond of an atom selected from the group consisting of nitrogen and oxygen.

4. In a process for producing a colored image in a photographic material, the steps which comprise exposing a light-sensitive silver halide emulsion layer containing a water-soluble dye-forming compound containing —$SO_3$ cation solubilizing groups and said dye-forming compound comprising a high molecular weight polymeric linear chained radical of the group consisting of polymeric hydrocarbon radicals, polymeric oxahydrocarbon radicals, and polymeric carboxylic acid amide radicals having recurring amide groups in the main linear polymeric chain, said polymeric radical carrying a plurality of —$SO_2Y$ groups outside the main linear polymeric chain, wherein Y is a radical selected from the group consisting of azo dye coupling components and a radical capable of coupling with the oxidation products of a primary aromatic amino color developer to form a dye, said radical Y being attached to the $SO_2$ radical by the valence bond of an atom selected from the group consisting of nitrogen and oxygen, said —$SO_2Y$ groups being linked to the main linear chain of said polymeric radical only through carbon atoms selected from the group consisting of carbon atoms of phenyl *nuclei, carbon atoms of naphthyl* nuclei and carbon atoms of the main linear chain, and forming a dye in said layer for said colored image comprising said polymeric radical by a coupling reaction.

5. In a process for producing a colored image in a photographic material, the steps which comprise exposing a light-sensitive silver halide emulsion layer containing a water-soluble non-diffusing azo coupling component containing —$SO_3$ cation solubilizing groups and said azo coupling component comprising a high molecular weight polymeric linear chained radical of the group consisting of polymeric hydrocarbon radicals, polymeric oxahydrocarbon radicals, and polymeric carboxylic acid amide radicals having recurring amide groups in the main linear polymeric chain, said polymeric radical carrying a plurality of —$SO_2Y$ groups outside the main linear polymeric chain, wherein Y is an azo dye coupling component radical which is reactive with a diazo compound to form an azo dye comprising said polymeric radical, said radical Y being attached to the $SO_2$ radical by the valence bond of an atom selected from the group consisting of oxygen and nitrogen atoms, said $SO_2Y$ groups being linked to the main linear chain of said polymeric radical only through carbon atoms selected from the group consisting of carbon atoms of phenyl *nuclei, carbon atoms of naphthyl* nuclei and carbon atoms of the main linear chain, coupling said azo coupling component with a diazo compound to form an azo dye in said layer, developing and fixing said layer to form a metallic silver image in said layer and treating said layer to destroy said dye locally in the presence of said metallic silver image.

6. A process for producing a colored image in a photographic layer containing a metallic silver image and a water-soluble non-diffusing azo coupling component containing —$SO_3$ cation solubilizing groups and said azo coupling component comprising a high molecular weight polymeric linear chained radical of the group consisting of polymeric hydrocarbon radicals, polymeric oxahydrocarbon radicals, and polymeric carboxylic acid amide radicals having recurring amide groups in the main linear polymeric chain, said polymeric radical carrying a plurality of —$SO_2Y$ groups outside the main linear polymeric chain, wherein Y is an azo dye coupling component radical which is reactive with a diazo compound for forming an azo dye comprising said polymeric radical, said radical Y being attached to the $SO_2$ radical by the valence bond of an atom selected from the group consisting of oxygen and nitrogen atoms, said —$SO_2Y$ groups being linked to the main linear chain of said polymeric radical only through carbon atoms of phenyl *nuclei, carbon atoms of naphthyl* nuclei and carbon atoms of the main linear chain, coupling said azo coupling component with a diazo compound to form an azo dye in said layer and treating said layer to destroy said dye locally in the presence of said metallic silver image.

7. A process for producing a colored image in a photographic layer containing a light-sensitive silver halide and as a color former a water-soluble non-diffusing compound containing —$SO_3$ cation solubilizing groups and said compound comprising a high molecular weight polymeric linear chained radical of the group consisting of polymeric hydrocarbon radicals, polymeric oxahydrocarbon radicals, and polymeric carboxylic acid amide radicals having recurring amide groups in the main linear polymeric chain, said polymeric radical carrying a plurality of —$SO_2Y$ groups outside the main linear polymeric chain, wherein Y is a radical capable of coupling with the oxidation products of a primary aromatic amino color developer to form a dye, said radical Y being attached to the $SO_2$ radical by the valence bond of an atom selected from the group consisting of oxygen and nitrogen atoms, said —$SO_2Y$ groups being linked to the main linear chain of said polymeric radical only through carbon atoms selected from the group consisting of carbon atoms of phenyl *nuclei, carbon atoms of naphthyl* nuclei and carbon atoms of the main linear chain, which comprises exposing said layer and developing said layer with a primary aromatic amino color developer.

8. A photographic material comprising an emulsion layer containing a light-sensitive silver halide and a water-soluble non-diffusing dye-forming compound containing —$SO_3$ cation solubilizing groups and said dye-forming compound comprising a high molecular weight polymeric linear chained hydrocarbon radical carrying a plurality of —$SO_2Y$ groups outside the main linear polymeric chain, wherein Y is a radical selected from the group consisting of azo dye coupling components and a radical capable of coupling with the oxidation products of a primary aromatic amino color developer to form a dye, said radical Y being attached to the $SO_2$ radical by the valence bond of an atom selected from the group consisting of nitrogen and oxygen, said —$SO_2Y$ groups being linked to the main linear chain of said polymeric radical only through carbon atoms selected from the group consisting of carbon atoms of phenyl *nuclei, carbon atoms of naphthyl* nuclei and carbon atoms of the main linear chain.

9. In a process for producing a colored image in a photographic material, the steps which comprise exposing a light-sensitive silver halide emulsion layer containing a water-soluble non-diffusing dye-forming compound containing —$SO_3$ cation solubilizing groups and said dye-forming compound comprising a high molecular weight polymeric linear chained hydrocarbon radical carrying a plurality of —$SO_2Y$ groups outside the main linear polymeric chain, wherein Y is a radical selected from the group consisting of azo dye coupling components and a radical capable of coupling with the oxidation products of a primary aromatic amino color developer to form a dye, said radical Y being attached to the $SO_2$ radical by the valence bond of an atom selected from the group consisting of nitrogen and oxygen, said —$SO_2Y$ groups being linked to the main linear chain of said polymeric radical only through carbon atoms selected from the group consisting of carbon atoms of phenyl *nuclei, carbon atoms of naphthyl* nuclei and carbon atoms of the main linear chain, and forming a dye in said layer for said colored image containing said polymeric hydrocarbon radical, by a coupling reaction.

10. In a process for producing a colored image in a photographic material, the steps which comprise exposing a light-sensitive silver halide emulsion layer containing a water-soluble non-diffusing dye-forming compound containing —$SO_3$ cation solubilizing groups and said dye-forming compound comprising a high molecular weight styrene polymer carrying a plurality of —$SO_2Y$ groups in the phenyl nuclei of said styrene polymer, wherein Y is a radical selected from the group consisting of azo dye coupling components and a radical capable of coupling with the oxidation products of a primary aromatic amino color developer to form a dye, said radical Y being attached to the $SO_2$ radical by the valence bond of an atom selected from the group consisting of nitrogen and oxygen, and forming a dye in said layer for said colored image containing said styrene polymer, by a coupling reaction.

11. A silver halide emulsion containing as a non-diffusing color former a polymeric coupler prepared by reacting a polyvinyl sulfonyl chloride with an amino-substituted color former capable of reacting with the oxidation product of a primary aromatic amino developing agent.

12. A silver halide emulsion containing as a non-diffusing color former a polymeric coupler having recurring units of the structure:

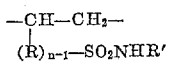

where R is a group containing an aryl radical, R′ is a color former capable of reacting with the oxidation product of a primary aromatic amino developing agent, including an aryl group and n is an integer from 1 to 2.

13. A silver halide emulsion containing as a non-diffusing color former a polymeric coupler having recurring units of the structure:

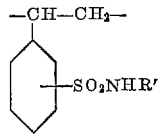

where R′ is a color former capable of reacting with the oxidation product of a primary aromatic amino developing agent, including an aryl group.

14. The process of producing color developed dye images in a photographic silver halide emulsion which comprises exposing the emulsion of claim 12 and developing it with a primary aromatic amino developing agent.

References Cited in the file of this patent or the original patent

UNITED STATES PATENTS

| | | |
|---|---|---|
| 2,289,804 | Peterson | July 4, 1942 |
| 2,306,410 | Schinzel | Dec. 29, 1942 |
| 2,356,759 | Gaspar | Aug. 29, 1944 |
| 2,422,680 | Jennings | June 24, 1947 |
| 2,470,769 | Gaspar | May 24, 1949 |
| 2,688,542 | Dreyfuss | Sept. 7, 1954 |
| 2,759,816 | Minsk | Aug. 21, 1956 |

FOREIGN PATENTS

| | | |
|---|---|---|
| 551,120 | Great Britain | Feb. 8, 1943 |
| 651,958 | Great Britain | Apr. 11, 1951 |